Patented May 15, 1923.

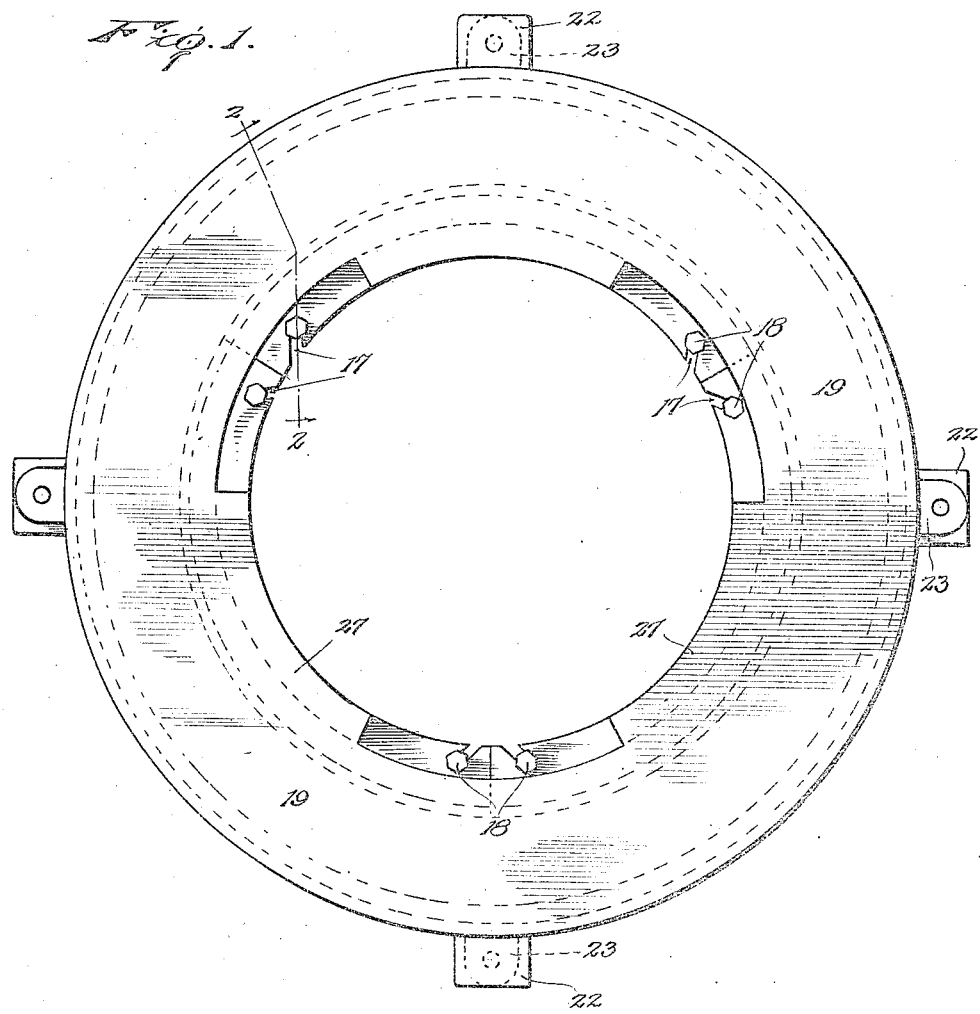
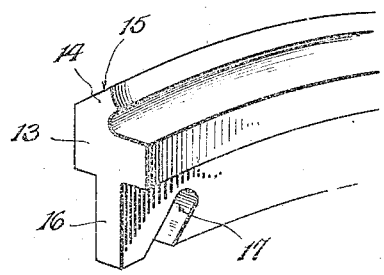

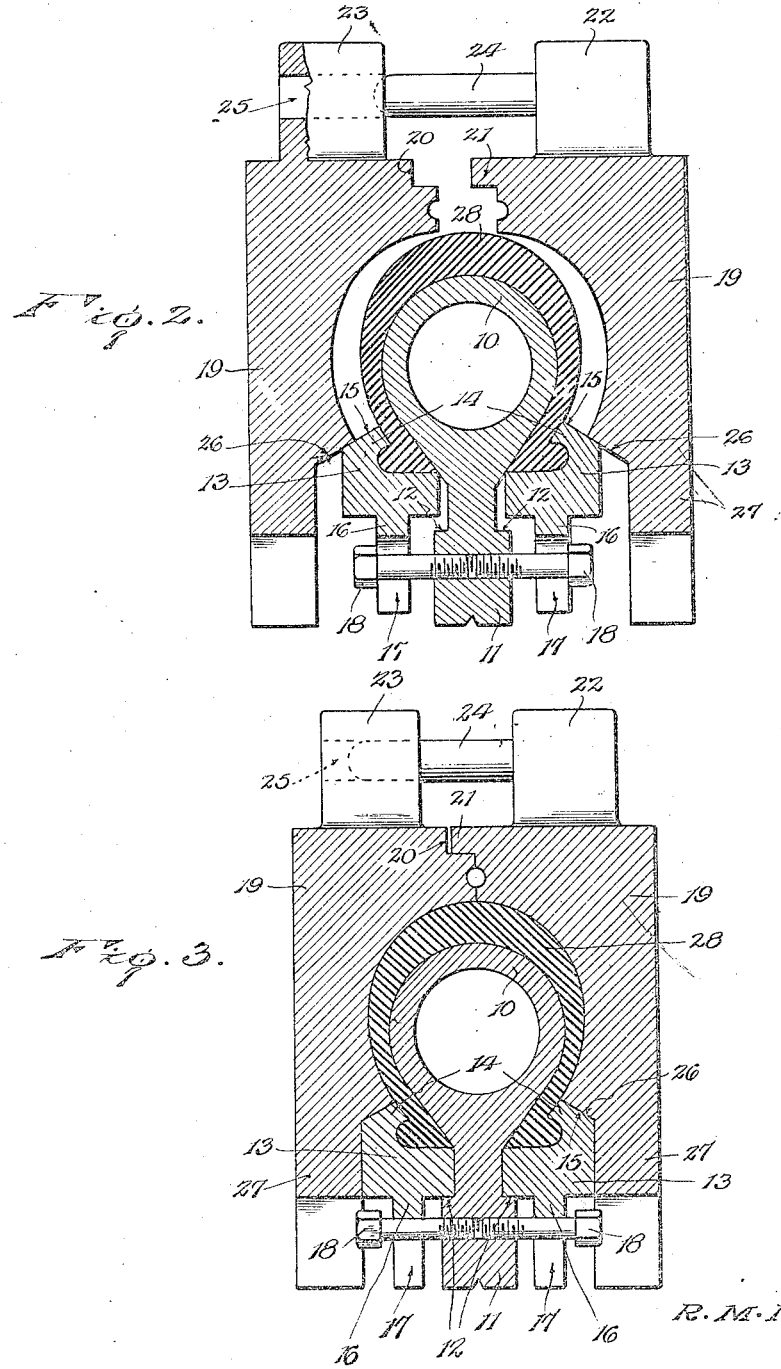

1,455,218

UNITED STATES PATENT OFFICE.

ROBERT MITCHELL MERRIMAN, OF AKRON, OHIO.

TIRE MOLD.

Application filed April 18, 1922. Serial No. 555,189.

*To all whom it may concern:*

Be it known that I, ROBERT M. MERRIMAN, citizen of the United States, residing at Akron, in the county of Summit and State of Ohio, have invented certain new and useful Improvements in Tire Molds, of which the following is a specification.

This invention relates to an improved mold for tire casings and seeks, as one of its principal objects, to provide a mold which will operate to properly stretch a casing and hold the fabric plies thereof under the desired tension while the tire is being cured to thus eliminate buckles and wrinkles in the fabric.

The invention has as a further object to provide a mold wherein the casing will be stretched uniformly throughout its circumference.

The invention has as a still further object to provide a mold wherein closing of the mold will serve to accomplish stretching of the casing.

And the invention has as a still further object to provide a mold employing bead rings to engage the beads of the casing, wherein said rings may be loosely connected to the core of the mold, wherein the side plates of the mold will be formed to coact with said ings for contracting the rings and stretching the casing, and wherein the means employed for loosely connecting the rings with the core will serve to guide the rings in their contracting movement.

Other and incidental objects will appear hereinafter.

In the drawings:

Figure 1 is a side elevation of my improved mold, Figure 2 is a sectional view on the line 2—2 of Figure 1, looking in the direction of the arrows and showing the mold partially closed, Figure 3 is a sectional view showing the mold closed, and Figure 4 is a fragmentary perspective view showing a end of one of the sections of the bead rings employed.

In carrying the invention into effect, I employ a tubular core 10 from which extends an inwardly directed annular flange 11 cut away at opposite sides thereof to form stop shoulders 12. Formed to mate with said flange are bead rings 13 lying at opposite sides of the flange. These rings are each composed of a plurality of segmental sections having bead engaging flanges 14 and formed with beveled outer faces 15 while from the inner faces of said sections extend flanges 16. Formed in the flange 16 of each of the sections near its ends are, as particularly shown in Figure 1, chordally disposed slots 17 and extending freely through said slots are cap bolts 18 threaded into the flange 11 of the core slidably connecting the sections of the rings with the core. Cooperating with the core are mating annular side plates 19, one of which is provided at its periphery with a channel 20 while the other is provided with an overhanging flange 21 adapted to slidably fit in said channel and upstanding from said plates at suitably spaced points thereabout are lugs 22 and 23 respectively. The lugs 22 carry pins 24 while the lugs 23 are provided with openings 25 freely accommodating said pins for slidably connecting the side plates and centering said plates with respect to each other. At their inner sides, the plates are cut away to define the mold cavity and are provided with annular inclined shoulders 26 adapted to seat flat against the beveled faces 15 of the bead rings and extending from the plates flush with the side faces thereof are inwardly directed side flanges 27 overlying the bead rings. As shown in Figure 1, these flanges are cut away at spaced points to expose the heads of the bolts 18.

In use, a tire is built up upon the core, the tire being conventionally illustrated at 28, when, as shown in Figure 2, the flanges 14 of the side rings 13 are engaged with the beads of the tire. The bolts 18 are then inserted through the slots 17 of the sections of the rings for connecting said sections with the flange 11 of the core and supporting the sections assembled. The side plates 19 are then arranged to coact with the bead rings at opposite sides of the core, the shoulders 26 of the plates engaging the beveled faces 15 of the rings and the centering pins 24 of the plates projecting into the openings 25 of the lugs 23. Pressure is then applied for closing the mold about the tire, the side plates being, as shown in Figure 3, moved into abutting relation having the side flanges 27 thereof resting against the outer edges of the bead rings. When the mold is thus closed, the shoulders 26 of the side plates will ride over the beveled faces 15 of the bead rings for forcing the sections thereof radially inward to contract the rings and also shifting the rings toward each other to abut the flange 11 of the core limited by the stop shoulders 12 of said flange. As will be perceived, contraction of the bead rings will serve to stretch the tire over the core so that any wrinkles or buckles in the fabric of the tire will be eliminated while the tire will be held under tension within the mold during the curing operation. Furthermore, attention is directed to the fact that the bolts 18 will not only hold the bead rings in position while the mold is being assembled but will also, when the side plates are being closed, lock the sections of the rings against individual movement as well as hold the ends of the sections in register so that as the side plates are brought together, tension on the rings will be equally distributed throughout the circumference thereof. Accordingly, the tension of the rings upon the sides of the tire will be equally distributed circumferentially of the tire so that an even tension upon the fabric of the tire will be had throughout. Overstressing of the tire at points and understressing of the tire at other points will thus be obviated.

Having thus described the invention, what is claimed as new is:

1. In combination, a tire core, contractible means for reducing the circumference of the inner edges of a tire positioned on the core, and means connecting said first mentioned means with the core operating to guide said first mentioned means when contracted.

2. In combination, a tire core, contractible means for reducing the circumference of the inner edges of a tire positioned on the core, and fastening devices connecting said means with the core operating to guide the means when contracted.

3. In combination, a tire core, a contractible ring to engage the inner edge of a tire positioned on the core, and means connecting the ring with the core operating to guide the ring when contracted.

4. In combination, a tire core, a contractible ring to engage the inner edge of a tire positioned on the core, and fastening devices connecting the ring with the core operating to guide the ring when contracted.

5. A tire mold including a core, contractible sectional means to engage the inner edges of a tire upon the core, side plates adapted to coact with said means for stretching the tire, and means locking the sections of the first means against endwise movement.

6. A tire mold including a core, contractible sectional means to engage the inner edges of a tire upon the core, side plates adapted to coact with said means for stretching the tire, and means connecting the sections of the first means with the core operating to guide the first means when contracted and locking the sections thereof against individual endwise movement.

7. A tire mold including a core, contractible sectional bead rings to engage the inner edges of a tire upon the core, side plates adapted to coact with said rings for stretching the tire, and means locking the sections of the rings against endwise movement.

8. A tire mold including a core, contractible sectional bead rings to engage the inner edges of a tire upon the core, side plates adapted to coact with said rings for stretching the tire, and fastening devices connecting the sections of said rings with the core operating to guide the sections when the rings are contracted and locking the sections of the rings against individual endwise movement.

9. A tire mold including a core, contractible means to engage the inner edges of a tire upon the core, and means slidably connecting said first mentioned means with the core to guide said first mentioned means when contracted.

10. A tire mold including a core, contractible sectional bead rings to engage the inner edges of a tire upon the core, the sections of said rings being provided with flanges having slots therein, fastening devices extending freely through said slots connecting the sections of the rings with the core, and side plates to coact with said rings for stretching the tire.

In testimony whereof I affix my signature.

ROBERT MITCHELL MERRIMAN. [L. S.]